(12) United States Patent
Cheng et al.

(10) Patent No.: US 9,369,827 B2
(45) Date of Patent: Jun. 14, 2016

(54) METHOD AND SYSTEM FOR NEAR FIELD COMMUNICATION OF ELECTRONIC DEVICE

(71) Applicant: SHENZHEN HUIDING TECHNOLOGY CO., LTD., Shenzhen, Guangdong (CN)

(72) Inventors: Siqiu Cheng, Shenzhen (CN); Zirong Li, Shenzhen (CN); Jun Fang, Shenzhen (CN); Xinchang Wu, Shenzhen (CN); Meng-Ta Yang, Shenzhen (CN)

(73) Assignee: SHENZHEN HUIDING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/381,224

(22) PCT Filed: Apr. 25, 2014

(86) PCT No.: PCT/CN2014/076223
§ 371 (c)(1),
(2) Date: Aug. 27, 2014

(87) PCT Pub. No.: WO2015/100888
PCT Pub. Date: Jul. 9, 2015

(65) Prior Publication Data
US 2015/0281874 A1 Oct. 1, 2015

(30) Foreign Application Priority Data

Dec. 31, 2013 (CN) .......................... 2013 1 0752481

(51) Int. Cl.
*H04B 5/00* (2006.01)
*H04W 4/00* (2009.01)
(Continued)

(52) U.S. Cl.
CPC ................ *H04W 4/008* (2013.01); *H04B 5/02* (2013.01); *H04B 15/00* (2013.01); *H04L 5/0055* (2013.01)

(58) Field of Classification Search
CPC ........ H04B 15/00; H04B 5/02; H04L 5/0055; H04W 4/008
USPC ............. 455/41.1, 41.2, 41.3, 411, 558, 67.7, 455/67.4, 226.2, 73, 452.2; 370/343, 241, 370/329, 252, 342; 340/10.1
See application file for complete search history.

(56) References Cited

U.S. PATENT DOCUMENTS 5,689,813 A * 11/1997 Seki ..................... H04B 17/327
340/539.1
7,848,825 B2 * 12/2010 Wilson .................. G06F 3/0416
345/173
(Continued)

*Primary Examiner* — Tan H Trinh

(57) ABSTRACT

A method and a system for near field communication of an electronic device are disclosed. The method comprises: communicating frequency points at which the two parties suffer from interference with a second electronic device through a scanning frame, wherein the scanning frame comprises at least two symbols modulated by using different frequencies; and determining a modulation manner according to the available frequency points in order to perform data transmission with the second electronic device. With the embodiment of the present invention, interference frequencies in the communication environment are detected by sending the scanning frame which comprises at least two symbols modulated by using different frequencies, and frequency points with smaller interference are selected for adaptation modulation data, thus the interference frequency points are shielded from data transmission, and external interference in the near field communication is avoid, and communication stability is improved, and communication quality is improved.

30 Claims, 7 Drawing Sheets

(51) Int. Cl.
  *H04B 5/02*  (2006.01)
  *H04B 15/00* (2006.01)
  *H04L 5/00*  (2006.01)

(56) References Cited

U.S. PATENT DOCUMENTS

| | | | | |
|---|---|---|---|---|
| 2006/0073787 A1* | 4/2006 | Lair | H04M 1/6066 | 455/41.1 |
| 2008/0267158 A1* | 10/2008 | Zhang | H04B 7/0671 | 370/342 |
| 2008/0272889 A1* | 11/2008 | Symons | H02J 7/025 | 340/10.1 |
| 2009/0245221 A1* | 10/2009 | Piipponen | H04W 88/06 | 370/343 |
| 2010/0015917 A1* | 1/2010 | Symons | H04B 5/0075 | 455/41.1 |
| 2011/0070825 A1* | 3/2011 | Griffin | H04B 5/0031 | 455/41.1 |
| 2011/0070827 A1* | 3/2011 | Griffin | H04B 5/02 | 455/41.1 |
| 2011/0070828 A1* | 3/2011 | Griffin | H04M 1/7253 | 455/41.1 |
| 2011/0165862 A1* | 7/2011 | Yu | H04M 1/7253 | 455/411 |
| 2011/0255414 A1* | 10/2011 | Chen | H04W 8/055 | 370/241 |
| 2011/0275316 A1* | 11/2011 | Suumaki | G06K 7/10237 | 455/41.1 |
| 2012/0135687 A1* | 5/2012 | Thorn | H04M 1/7253 | 455/41.2 |
| 2012/0282942 A1* | 11/2012 | Uusitalo | H04W 16/14 | 455/452.2 |
| 2013/0223250 A1* | 8/2013 | Matsuo | H04W 74/0808 | 370/252 |
| 2013/0225074 A1* | 8/2013 | Charles | H04B 5/0037 | 455/41.1 |
| 2013/0281013 A1* | 10/2013 | Hillan | H04B 5/02 | 455/41.1 |
| 2013/0309965 A1* | 11/2013 | Hillan | H04B 5/02 | 455/41.1 |
| 2013/0314214 A1* | 11/2013 | Leica | H04W 4/008 | 340/10.1 |
| 2013/0344804 A1* | 12/2013 | Chen | H04B 5/02 | 455/41.1 |
| 2014/0256248 A1* | 9/2014 | Cargill | H04B 5/005 | 455/41.1 |
| 2014/0269338 A1* | 9/2014 | Jung | H04L 5/0055 | 370/241 |
| 2014/0269548 A1* | 9/2014 | Lim | H04L 1/0026 | 370/329 |
| 2014/0273843 A1* | 9/2014 | Gimeno Monge | H04B 1/1027 | 455/41.1 |
| 2014/0286133 A1* | 9/2014 | Li | G01S 5/186 | 367/117 |
| 2014/0335790 A1* | 11/2014 | Dees | H04M 1/7253 | 455/41.2 |
| 2015/0230283 A1* | 8/2015 | Li | H04B 5/0031 | 455/41.1 |

* cited by examiner

First CRC frame

Second CRC frame

METHOD AND SYSTEM FOR NEAR FIELD COMMUNICATION OF ELECTRONIC DEVICE

TECHNICAL FIELD

The present invention belongs to a technical field of near field communication, and particularly relates to a method and a system for near field communication of an electronic device.

BACKGROUND ART

Non-contact point-to-point data transmission is enabled within about ten centimeters between electronic devices through Near Field Communication (NFC) utilizing electric field. Due to its low transmission power, near communication distance, and comparatively high security, the NFC is widely applied in the industry of logistics, payment, finance and warehouse management, etc. As the rise of wireless internet and common usage of smart-phone, the usage of functions of mobile payment, material sharing and the like becomes more and more widely.

However, as a detectable signal of near field communication is comparatively weak and easily suffers from electro-magnetic interference in a communication environment, communication quality cannot be ensured. For example, in an application situation of touch screen, when the communication between two devices is not established, because the communication signal between the two touch screens is very weak; meanwhile, the capacitive screens are generally very close to an LCD, the driving signal of the LCD would disturb the communication signal between the capacitive screens, and in a case that the display screen is switched on, the communication is substantially unable if the interference is received.

SUMMARY

In view of this, the technical problem to be solved in the present invention is to provide a method and a system for near field communication of an electronic device, so as to solve that a second electronic device which is communicable is detected in an interference environment, and a modulation manner is determined according to an interference frequency, thus interference frequency points are shielded for performing data transmission and the communication quality is ensured.

In the present invention, the technical solution employed to solve the above mentioned technical problem is as follows:

According to one aspect of the present invention, provided is a method for near field communication of an electronic device, wherein the method is applied to a first electronic device and comprises:
communicating frequency points at which the two parties suffer from interference with a second electronic device through a scanning frame, and determining a modulation manner according to available frequency points, wherein the scanning frame comprises at least two symbols modulated by using different frequencies;
performing data transmission with the second electronic device according to the determined modulation manner.
Preferably, prior to the method, it also comprises a step of sending detection frame signal in order to detect the second electronic device which is communicable, and the step further comprises:

sending the detection frame signal, wherein the detection frame comprises at least two symbols modulated by using different frequencies.
according to a received response frame responded by the second electronic device, judging whether the second electronic device is within the range where the near field communication is available.

Preferably, communicating the frequency points at which the two parties suffer from interference with the second electronic device through the scanning frame further comprises:
sending the scanning frame to the second electronic device;
according to a received response frame responded by the second electronic device, obtaining the information of the frequency points at which the two parties suffer from the interference; or obtaining its own interference frequency point information through the scanning frame responded by the second electronic device, and obtaining the information of frequency points at which the second electronic device suffers from interference.
according to the information of the frequency points at which the two parties suffer from interference, feeding back an available frequency point frame to the second electronic device.

Preferably, according to the received response frame responded by the second electronic device, obtaining the frequency points at which the two parties suffer from interference further comprises:
according to the positions where and/or times each frequency point appears in the response frame, determining the interference frequency point information of the second electronic device;
or, according to the times that each frequency point appears in the scanning frame responded by the second electronic device, determining its own interference frequency point information, and according to the positions where and/or times that each frequency point appears in the response frame, determining the interference frequency point information of the second electronic device.

Preferably, according to the information of frequency points at which the two parties suffer from interference, feeding the available frequency point frame to the second electronic device further comprises:
according its own interference frequency point information and the interference frequency point information of the second electronic device, obtaining the available frequency point frame;
sending the available frequency point frame to the second electronic device.

Preferably, after performing the data transmission with the second electronic device, it also comprises: a step of detecting whether the second electronic device has left a communicable range, and the step further comprises: if the response of the second electronic device is not detected in a preset time after sending detection frame signal, then judging that the second electronic device has left the communicable range.

According to another aspect of the present invention, provided is a method for near field communication of an electronic device, wherein the method is applied to a second electronic device and comprises the following steps:
receiving a scanning frame sent by a first electronic device, and obtaining frequency points at which itself suffer from interference;
sending to the first electronic device a response frame which adds its own interference frequency point information;

receiving an available frequency point frame sent by the first electronic device, and obtaining available frequency point information;

according to the available frequency point information, determining a modulation manner in order to perform data transmission with the first electronic device.

According to still another aspect of the present invention, provided is a system for near field communication of an electronic device, wherein the system comprises a first electronic device, and the first electronic device comprises:

a frequency scanning module, for communicating frequency points at which the two parties suffer from interference with a second electronic device through a scanning frame, and determining a modulation manner according to available frequency points, wherein the scanning frame comprises at least two symbols modulated by using different frequencies;

a data transmission module, for performing data transmission with the second electronic device.

Preferably, the first electronic device also comprises a approach detection module, for sending detection frame signal, and according to a received response frame responded by the second electronic device, judging whether the second electronic device is within a range where the near field communication is available, wherein the detection frame comprises at least two symbols modulated by using different frequencies.

Preferably, the first electronic device also comprises a version negotiation module, for sending version information to the second electronic device through a version frame, and determining a used version according to a version response frame fed back by the second electronic device.

Preferably, the first electronic device also comprises a leaving detection module, for detecting whether the second electronic device has left a communicable range.

Preferably, the leaving detection module is specifically used for: when the second electronic device which is communicable is not detected by sending detection frame signal, judging whether the second electronic device has left the communicable range.

Preferably, the frequency scanning module is specifically used for: sending the scanning frame to the second electronic device, according to a received response frame responded by the second electronic device, obtaining the frequency points at which the two parties suffer from interference, feeding back an available frequency point frame to the second electronic device, and determining a modulation manner according to available frequency points.

Preferably, the data transmission module is specifically used for: sending an initial frame, at least one data frame and a CRC frame to the second electronic device in turn.

Preferably, the system also comprises the second electronic device, and the second electronic device comprises:

a second receiving module, for receiving the scanning frame sent by the first electronic device; and also for receiving an available frequency point frame sent by the first electronic device;

a second sending module, for sending to the first electronic device a response frame that adds its own interference frequency point information;

a second modulation determination module, for obtaining available frequency points according to the available frequency point frame, and determining a modulation manner according to the available frequency points;

a second data transmission module, for performing data transmission with the first electronic device.

The present invention provides a method and a system for near field communication of an electronic device. With the embodiments of the present invention, interference frequencies in the communication environment are detected by sending a scanning frame which comprises at least two symbols modulated by using different frequencies, and frequency points with smaller interference are selected for adaptation modulation data, thus the interference frequency points are shielded from data transmission, and external interference in the near field communication is avoid, and communication quality is improved.

DETAILED DESCRIPTION OF THE EMBODIMENTS

In order to make the technical problems to be solved by the present invention, technical solutions, and beneficial effects more clearly and obviously, with reference to the appended figures and embodiments, the present invention is further specifically described in the following. It should be understood that the detailed embodiments described herein are merely used for explaining the present invention, and do not limit the present invention.

A first electronic device refers to a party that initiates communication positively, and a second electronic device refers to another party of communication. For description convenience and intuition, in the following, the first electronic device is referred to as a Master, and the second electronic device is referred to as a Slave.

Embodiment 1

Figure 1:
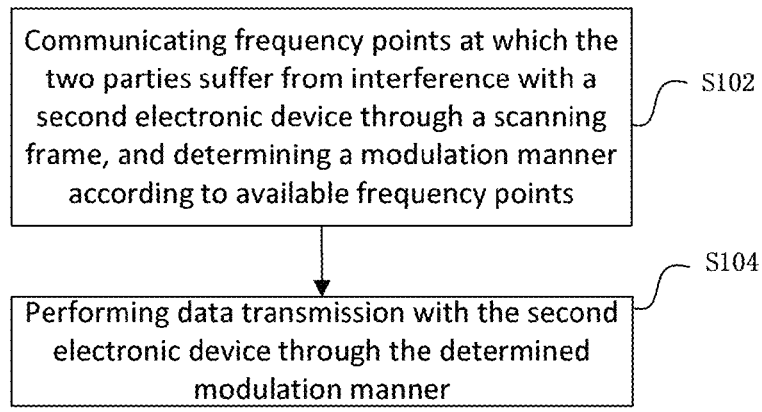
FIG. 1 is a flow chart of a method for near field communication of an electronic device provided by the embodiment of present invention.

FIG. 1 shows a flow chart of a method for near field communication of an electronic device provided by the embodiment of present invention, wherein the method is applied to a Master, and when the Master does not detect a second electronic device, a touch detection and an approach detection may be multiplexed, and when the second electronic device within a nearby communicable range is detected, the touch detection is paused and the near field communication is started. It specifically comprises the following steps:

S102, communicating frequency points at which the two parties suffer from interference with a Slave through a scanning frame, and determining a modulation manner according to available frequency points, wherein the scanning frame comprises at least two symbols modulated by using different frequencies.

Figure 2:
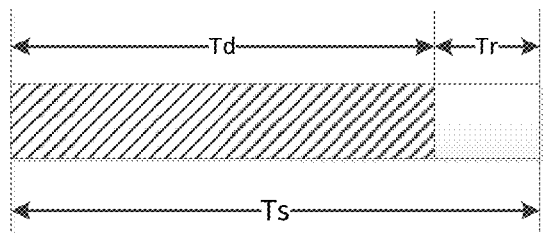
FIG. 2 is a schematic diagram of the structure of the symbol in the embodiment of the present invention.

Please refer to FIG. 2, symbol is the minimum communication unit for carrying bit data, and a modulation manner of the symbol employs a manner similar to FSK (frequency shift keying) and may be used for carrying pilots and data information, wherein a plurality of symbols consist of a frame. Please refer to FIG. 2, Ts=200 microseconds, Td=0.8 Ts=160 microseconds, Tr=0.2 Ts=40 microseconds. During the time interval of Td, a touch screen sends signal that is modulated with the FSK. During the time of Tr, the touch screen sends no signal. Because generally a driving circuit of the touch screen needs some time to switch between different frequencies, some idle time is needed; meanwhile, Tr may also be switching preserved time from sending to receiving.

Figure 3:
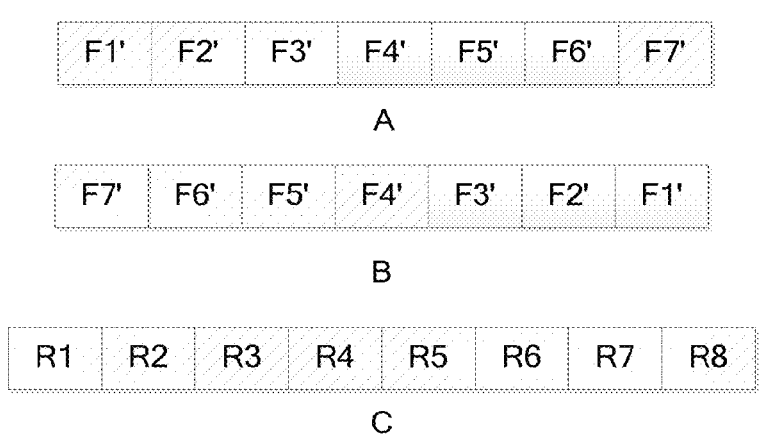
FIG. 3 is a schematic diagram of the structure of a scanning frame provided by the preferred embodiment of the present invention.

Please refer to FIG. 3, the scanning frame in this embodiment is preferably consisted of 7 symbols modulated by different frequencies. The scanning frame that the Master sends to the Slave for the first time is A, and A is [$F_1'$, $F_2'$, $F_3'$, $F_4'$, $F_5'$, $F_6'$, $F_7'$], wherein the $F_1'$, $F_2'$, $F_3'$, $F_4'$, $F_5'$, $F_6'$, $F_7'$ represent symbols modulated by using different frequencies respectively. The scanning frame B is an A's inverted frame [$F_7'$, $F_6'$, $F_5'$, $F_4'$, $F_3'$, $F_2'$, $F_1'$] which is used as a guide identifier. The response frame C is [R1, R2, R3, R4, R5, R6, R7, R8], wherein the R1~R8 represent symbols in $F_1'$, $F_2'$, $F_3'$, $F_4'$, $F_5'$, $F_6'$, $F_7'$.

Preferably, determining the modulation manner according to the available frequency points further comprises:
  when the available frequency points are greater than or equal to 6, the first 6 frequency points are selected to be modulated by a 4FSK manner;
  when the available frequency points are greater than or equal to 4 and smaller than 6, the first 4 frequencies are selected to be modulated by using a 2FSK manner;
  when the available frequency points are smaller than 4, re-selecting the scanning frame in order to perform a step of frequency scanning.

S104, performing data transmission with the Slave according to the determined modulation manner.

Wherein, the data transmission further comprises: the Master sends to the Slave an initial frame, at least one data frame and a CRC frame in turn.

With the embodiment of the present invention, the interference frequencies in a communication environment is detected by sending a scanning frame comprising at least two symbols modulated by using different frequencies, and frequency points with lower interference are selected for adaptation modulation data, thus the interference frequency points is shielded from data transmission, and external interference in the near field communication is avoided, and communication stability is enhanced, and communication quality is ensured.

Embodiment 2

Figure 4:
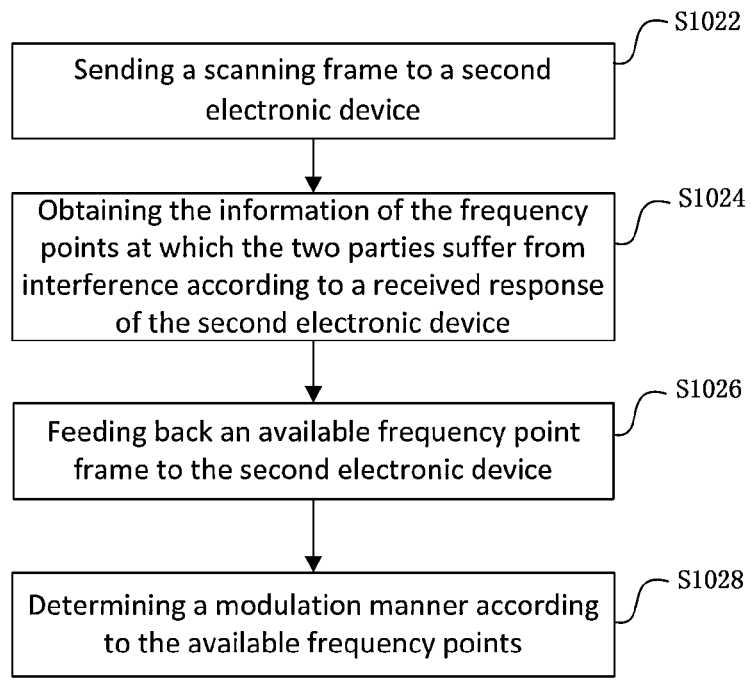
FIG. 4 is flow chart of another method for frequency scanning provided by the embodiment of the present invention.

FIG. 4 is a flow chart of a method for frequency scanning provided by the preferred embodiment of the present invention, wherein the method is applied to a Master. Refer to the FIG. 3 for the construction of a frame structure, and the method comprises the following steps:

S1022, the Master sending a scanning frame A to a Slave;

S1024, obtaining frequency points at which the two parties suffer from interference according to a received response of the Slave;

In detail, obtaining information of the frequency points at which the two parties suffer from interference according to a received response frame C1 responded by the Slave; or obtaining its own interference frequency point information through the scanning frame responded by the Slave, and obtaining the information of the frequency points at which the Slave suffers from interference according to the response frame responded by the Slave, wherein, the Master determines the interference frequency point information of the Slave according to the positions where and/or times that each frequency point appears in the response frame; and determining the information of its own frequency points which suffer from interference according to the times that each frequency point appears in the response frame.

S1026, feeding back an available frequency point frame C2 to the Slave.

As a preferred solution of this step, the Master adds its own interference frequency point information into the response frame C1, and the available frequency point frame C2 is obtained; and a preset guide frame B is firstly sent to the Slave, and then the available frequency point frame C2 is also sent. Obviously, the Master may also send the available frequency point frame C2 to the Slave directly.

Wherein, the available frequency point frame C2 is preferably obtained by transform on the basis of the following rules:

When there is no interference frequency point, the available frequency point frame is obtained by, after the scanning frame is inverted, appending any one of the frequency point symbols in the scanning frames at the end.

When there is only one interference frequency point, the available frequency point frame is obtained by moving the interference frequency point to be after the scanning frame, and moving forwards frequency point symbols after the interference frequency point in turn, and then adding a symbol of this interference frequency point at the end;

When there are at least two interference frequency points: the available frequency point frame is obtained by repeating the first interference frequency point symbols once and placing them after the available frequency point symbols of the scanning frame, and moving backwards the interference frequency point symbols after it in turn; or if the interference frequency points are the last continuous frequency points in the scanning frame, then the available frequency point frame is obtained by repeating the first interference frequency point symbols once and placing them after the available frequency points of the scanning frame, and moving backwards the interference frequency point symbols behind it in turn;

if the interference frequency points are the last continuous frequency points and other frequency points in the scanning frame, then the first interference frequency point symbols are placed after the available frequency points of the scanning frame, and the interference frequency point symbols after it are moved backwards in turn, and if it is a first frequency point of the last continuous frequency points, then repeating two times.

if the interference frequency points are not the last continuous frequency points in the scanning frame, then the first interference frequency point symbols are placed after the available frequency points of the scanning frame, and the interference frequency point symbols after it are moved backwards in turn, and any one of frequency points that suffer interference is added at the last, thus the available frequency point frame is obtained.

S1028, determining a modulation manner according to the available frequency points.

In detail, when the available frequency points are greater than or equal to 6, the first 6 frequency points are selected to be modulated by using a 4FSK manner; when the available frequency points are greater than or equal to 4 and smaller than 6, the first 4 frequencies are selected to be modulated by a 2FSK manner; and when the available frequency points are smaller than 4, re-selecting the scanning frame in order to perform a step of frequency scanning.

Embodiment 3

Figure 5:
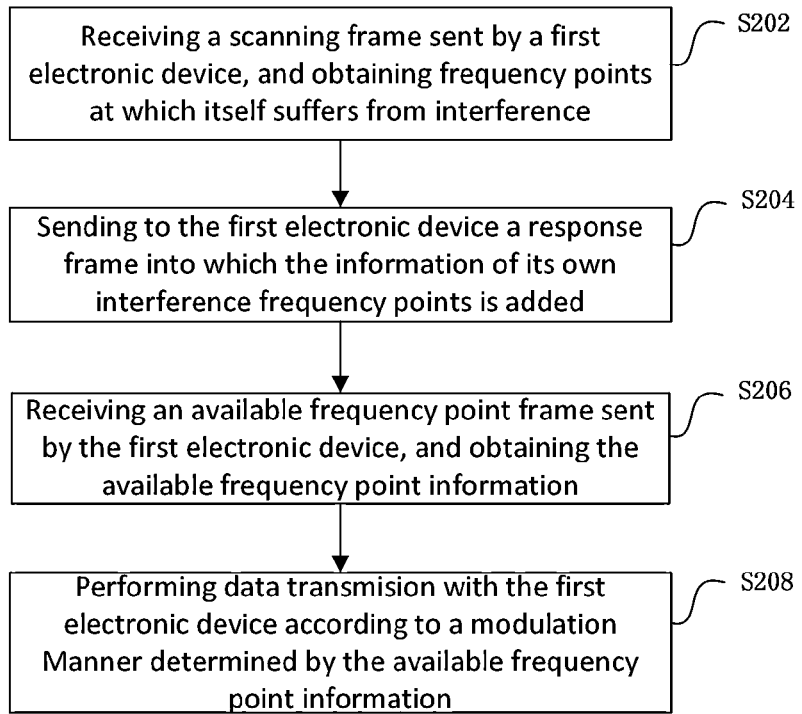
FIG. 5 is a flow chart of still another method for frequency scanning provided by the preferred embodiment of the present invention.

FIG. 5 shows a flow chart of another method for frequency scanning provided by the preferred embodiment of the present invention, wherein the method is applied to a Slave and specifically comprises the following steps:

S202, receiving a scanning frame A sent by a Master, and obtaining its own frequency points that suffer from interference.

S204, feeding back to the Master a response frame in which its own interference frequency point information is added.

In detail, the response frame may be obtained in the following manner:

When there is no interference frequency point, the response frame is obtained by, after the scanning frame is inverted, appending any one of frequency point symbols in the scanning frames at the end;

When there is only one interference frequency point, the response frame is obtained by moving the interference frequency point to be after the scanning frame, and moving forwards frequency point symbols after the interference frequency point in turn, and then adding a symbol of this interference frequency point at the end;

When there are at least two interference frequency points, the response frame is obtained in the following manner:

The response frame is obtained by repeating the first interference frequency point symbols once and placing them after available frequency points of the scanning frame, and moving backwards interference frequency point symbols after it in turn; or, if the interference frequency points are the last continuous frequency points in the scanning frame, then the response frame is obtained by repeating the first interference frequency point symbols once and placing them after the available frequency points of the scanning frame, and moving backwards interference frequency point symbols after it in turn;

If the interference frequency points are the last continuous frequency points and other frequency points in the scanning frame, then the first interference frequency point symbols are placed after the available frequency points of the scanning frame, and the interference frequency point symbols after it are moved backwards in turn, and if it is the first frequency point of the last continuous frequency points, then repeating two times;

If the interference frequency points are not the last continuous frequency points in the scanning frame, then the first interference frequency point symbols are placed after the available frequency points of the scanning frame, and the interference frequency point symbols after it are moved backwards in turn, and any one of frequency points that suffer from interference is added at the end, thus the response frame is obtained.

S206, receiving an available frequency point frame sent by the Master, and obtaining the available frequency point information.

In detail, when a preset guide information frame is sent before the Master sends the available frequency point frame, the Slave identifies an available frequency notification according to the guide information frame. When the guide information frame is not sent before the Master sends the available frequency point frame, the Slave may judge out the available frequency notification through a flow procedure, and obtain the available frequency points according to the positions where and/or times that each frequency point symbol in the available frequency point frame appears. S208, determining a modulation manner according to the available frequency point information in order to perform data transmission with the Master.

Embodiment 4

Figure 6:
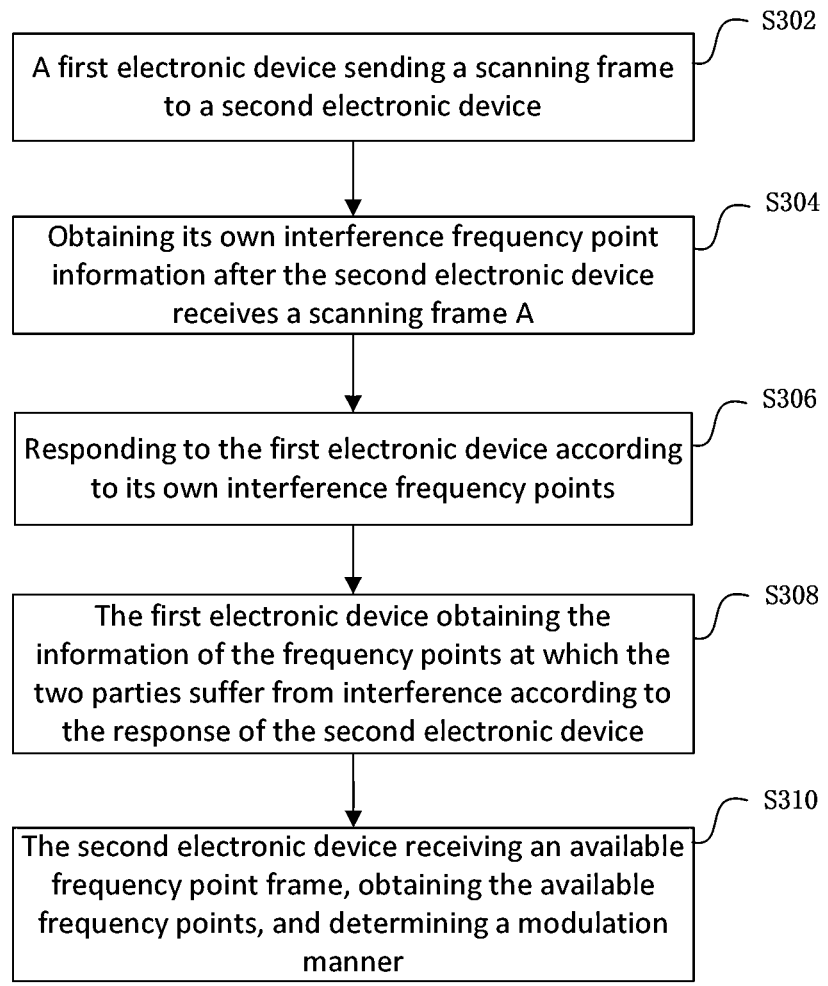
FIG. 6 is a flow chart of another method for frequency scanning provided by the preferred embodiment of the present invention.

FIG. 6 shows a flow chart of another method for frequency scanning provided by the preferred embodiment of the present invention, wherein the method comprises:

S302, a Master sending a scanning frame A to a slave.

S304, after receiving the scanning frame A, the Slave obtaining its own interference frequency point information.

In detail, for an FSK modulation, a method of magnitude judgment is used, i.e., there are a plurality of band-pass filters at a receiving end, and signal of carriers F1~F7 may be passed, and then the strength (magnitude) of each frequency signal is calculated, and frequency with the maximum strength is the carrier of the current symbol. For example, during an interval of some symbol, the signal strength of $F_6'$ is the largest, then the receiving end judges that the current carrier is $F_6'$; Assuming the frequency (i.e., symbol) $F_5'$ of the frame A suffers from interference at the Slave side, and the strength of the interference is larger than the signal magnitude of $F_6'$, then the scanning frame A that the Slave receives is actually [$F_1'$, $F_2'$, $F_3'$, $F_4'$, $F_5'$, $F_5'$, $F_7'$], because in a case of normal data reception, such signal sequences ([$F_1'$, $F_2'$, $F_3'$, $F_4'$, $F_5'$]) would not appear, the Slave may judge it is the scanning frame (it may also be confirmed through that the scanning frame is always appears at the beginning of a super-frame firstly); Meanwhile, as $F_5'$ appears two times, the Slave judges that $F_5'$ suffers from interference. The Master may user the same method to judge the frequencies that suffer from interference.

S306, the Slave responding to the Master according its own interference frequency point.

In detail, after the Slave detects the frame A, it may send a frame A as guide information firstly, and then respond to the Master a response frame C1 according to its own interference frequency point, or it may also directly respond to the Master the response frame C1 according to its own interference frequency points, wherein the response frame C1 may be obtained through transform on the basis of the following rules:

(a) If there is no interference, then the frame C is the scanning frame B+one symbol (any one selected from the seven frequencies of $F_1'$, $F_2'$, $F_3'$, $F_4'$, $F_5'$, $F_6'$, $F_7'$), totally 8 symbols;

(b) If there is only one frequency that suffers from interference, then the response is performed on the basis of the following rules: if there is only one interference frequency $F_i'$ (for the description convenience, the frequency number herein is as subscript), performing the following transforms to the frame A: the frame C=[$F_1'$, $F_2'$, L, $F_{i-1}'$, $F_{i+1}'$, L, $F_7'$, $F_i'$, $F_i'$], i.e., the interference frequency is put at the end of the frame A, and other frequencies after the $F_i$ are moved forwards in turn, and R8=$F_i'$, i.e., $FF_i'$ is continuously sent two times; For example, if the frequency $F_5'$ suffers from interference, then the frame C=[$F_1'$, $F_2'$, $F_3'$, $F_4'$, $F_6'$, $F_7'$, $F_5'$, $F_5'$].

(c) If there are at least two interference frequencies, then a plurality of the interference frequencies are moved after the frame A in turn, and the frequency with high number is placed at the end, and the last symbol is any frequency that suffers from interference and preferably is the first frequency that suffers from interference, for example, if the frequencies $F_2'$, $F_6'$ suffer from interference, then the frame C is [$F_1'$, $F_3'$, $F_4'$, $F_5'$, $F_7'$, $F_2'$, $F_6'$, $F_2'$]; Particularly, for a case that the interference frequencies are [$F_{n+1}'$, $F_{n+2}'$, ..., $F_7'$], then the frame C is [$F_1'$, $F_2'$, L, $F_n'$, $F_{n+1}'$, $F_{n+1}'$, $F_{n+2}'$, L, $F_6'$, $F_7'$], i.e., the $F_{n+1}'$ is repeated once, and other interference frequencies are placed after the $F_{n+1}'$ according to the number in an ascending order. For example, if $F_5'$, $F_6'$, $F_7'$ suffer from interference at the same time, then the frame C is [$F_1'$, $F_2'$, $F_3'$, $F_4'$, $F_5'$, $F_5'$, $F_6'$, $F_7'$], and if $F_2'$, $F_6'$, $F_7'$ suffer from interference at the same time, then the frame C is [$F_1'$, $F_3'$, $F_4'$, $F_5'$, $F_2'$, $F_6'$, $F_6'$, $F_7'$].

As a substitution solution of the above mentioned step (c), if there are a plurality of interference frequencies, then the first frequency that suffers from interference is repeated once, and the other interference frequencies are placed after the frame A in turn, for example, if $F_2'$, $F_6'$, $F_7'$ suffer from interference at the same time, then the frame C is [$F_1'$, $F_3'$, $F_4'$, $F_5'$, $F_2'$, $F_2'$, $F_6'$, $F_7'$].

S308, the Master obtaining the information of frequency points at which the two parties suffer from interference according to the response of the Slave, and responding to the Slave. In detail, corresponding to the above mentioned step S306, this step is processed according to two cases: when the Slave only responds the frame C1, the Master obtains the interference information of the two parties according to the frame C1; and when the Slave responds the frame A and frame C1, the Master is prefer to obtain its own information of suffering from interference according to the frame A, and obtain the interference information of the Slave according to the frame C1 (Of course, it may also obtain its own information of suffering from interference according to the frame C1). Wherein, the Master obtains its own interference frequency point information according to the same magnitude judgment rule as in the step S304, and adds its own interference information to the frame C1 according to the same transform rules as in the step S306, thus obtains an available frequency point frame C2. The Master may send the frame B as the guide information firstly, and then send the available frequency point frame C2, or may also send the available frequency point frame C2 directly. At this time, the Master may determine a modulation manner and corresponding modulation frequencies according to the available frequency points.

For example, the frame C1 that is sent by the Slave to the Master is [$F_1'$, $F_2'$, $F_3'$, $F_4'$, $F_6'$, $F_7'$, $F_5'$, $F_5'$], while the $F_3'$ of the Master suffers from interference, thus causing the $F_4'$ to be judged as the $F_3'$ incorrectly, then the Master judges it to be [$F_1'$, $F_2'$, $F_3'$, $F_3'$, $F_6'$, $F_7'$, $F_5'$, $F_5'$], wherein the $F_3'$ and $F_5'$ both appear more than one time, hence, it suffers from interference and the frame C2 responded by the Master is [$F_1'$, $F_2'$, $F_4'$, $F_6'$, $F_7'$, $F_3'$, $F_5'$, $F_5'$], and the Master selects $F_1'$, $F_2'$, $F_4'$, $F_6'$ as F1~F4; After the Slave receives the frame C2, the $F_1'$, $F_2'$, $F_4'$, $F_6'$ are selected to be the F1~F4.

In the above mentioned embodiment, in addition to judging the interference situation according to the times of suffering from interference, the situation of suffering from interference may be also judged according to the positions that the frequency appears. For example, the frame C1 that received by the Master from the Slave is [$F_1'$, $F_2'$, $F_3'$, $F_3'$, $F_4'$, $F_6'$, $F_7'$, $F_5'$, $F_5'$], while the $F_3'$ of the Master suffers from interference, thus causing the $F_4'$ is judged to be $F_3'$ incorrectly, then the Master judges it to be [$F_1'$, $F_2'$, $F_3'$, $F_3'$, $F_6'$, $F_7'$, $F_5'$, $F_5'$]. Obviously, according to the rules, when some frequency point does not suffer from interference, its appearance position should be not exceeding its index (as in [$F_1'$, $F_2'$, $F_3'$, $F_4'$, $F_5'$, $F_5'$, $F_6'$, $F_7'$], the F1~F7 appear at the positions of sequence Index=1~7 respectively; and according to the rules described in the step S306, when the interference appears, the frequencies that do not suffer from interference are only allowed to be move forwards), at this time, each frequency has its corresponding position; While in [$F_1'$, $F_2'$, $F_3'$, $F_3'$, $F_6'$, $F_7'$, $F_5'$, $F_5'$], the F3 appears in the position where the original F4 locates, and the F5 appears in the position where the original F7 locates. The positions that the two frequency points appear are after the positions that are designated by their indexes, so it may be considered that they suffer from interference.

S310, the Slave receiving the available frequency point frame C2, and obtaining the available frequency points and determining a modulation manner.

In detail, after the Slave receives the response of the Master, the first symbol of the frame C2 is responded as an ACK. If the content of the frame C2 indicates that there are 6 available frequencies, then the Slave considers that the communication of the next frame uses a 4FSK modulation, and the first 6 frequencies of the frame C2 are selected as F1~F6 for use, and the frequency scanning is ended. If the content of the frame C2 indicates that there are 4 or 5 available frequencies, then the frequencies of its first 4 symbols are selected to use a 2FSK modulation, and these frequencies are used as the F1~F4 according to the appearance order, and the frequency scanning is ended.

It is needed to be noted that, for the 2FSK, there are all no sufficient available frequencies, and if the Master only supports FS1, the steps S302~S310 are repeated. If the Master supports a frequency set of FS2, 7 frequencies (Preferably, to be 7 continuous frequencies) are selected therefrom, and the steps S302~S310 are repeated; And If the FS2 also do not have sufficient available frequencies, then the scanning is started by FS1 again.

In the above mentioned description, one example of the frequency set of the FS1 is FS1={450 KHz, 400 KHz, 350 KHz, 300 KHz, 250 KHz, 200 KHz, 150 KHz}, and one example of the FS2 is FS2={525 KHz, 487.5 KHz, 450 KHz, 412.5 KHz, 375 KHz, 337.5 KHz, 300 KHz, 262.5 KHz, 225 KHz, 187.5 KHz, 150 KHz}.

With the embodiment of the present invention, the interference frequency points in a communication environment are detected by utilizing the frequency scanning, and the frequency points with small interference are selected to determine the modulation manner of all the data frames in the super-frame to which the scanning frame belongs, thus the following may be overcome: while it is possible to improve the SNR during a communication phase in manners of switching off an LCD and communicating at the certain positions of the device, and the like, as the signal of the near field communication is weak, it maybe still suffer from the electromagnetism interference. Thus communication stability is further improved.

Embodiment 5

Figure 7:
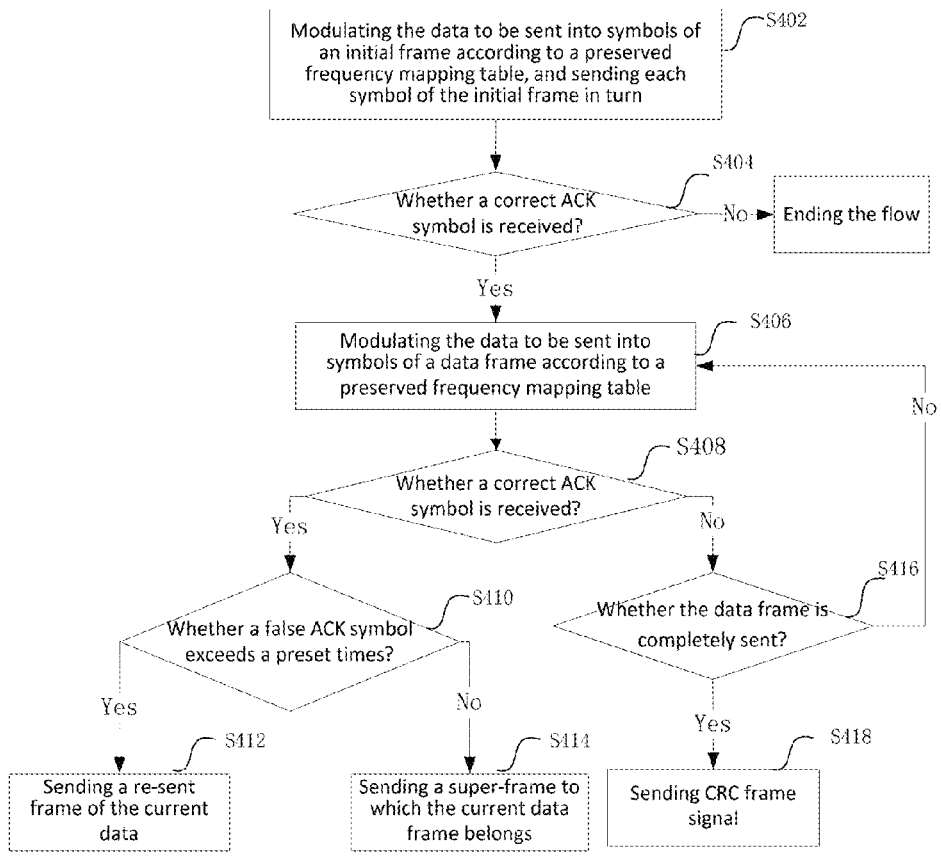
FIG. 7 is a flow chart of a method for data transmission provided by the preferred embodiment of the present invention.

FIG. 7 is a flow chart of a method for data transmission provided by the preferred embodiment of the present invention, wherein the method is applied to a Master and comprises:

S402, modulating the data to be sent into symbols of an initial frame according to a preserved frequency mapping table, and sending each symbol of the initial frame in turn.

For example, the frequency mapping table may be as the following table:

TABLE 1

| Signal identifier | Action | Typical frequency | Remark |
|---|---|---|---|
| F1 | A first pilot | 450K | It is CRC identifier that is before the data |
| F2 | A second pilot | 400K | It is re-sent identifier that is before the data |
| F3 | 0b00 | 350K | 2FSK is 0b0 |
| F4 | 0b01 | 300K | 2FSK is 0b1 |
| F5 | 0b10 | 250K | 2FSK is not used |
| F6 | 0b11 | 200K | |

Wherein, the signal identifier F1 is used as a first non-binary signal identifier (pilot), and the signal identifier F2 is used as a second pilot. Under a 4FSK, the signal F3~F6 identifiers are used as binary data 00, 01, 10, 11 respectively. In the case of the 2FSK, the F3 and F4 identify binary data 0, 1. The table lists out typical frequency of each signal identifier, and in actual operations, the frequency that each signal identifier refers to is determined by a frequency scanning procedure.

Figure 9:
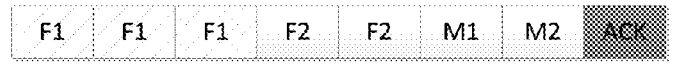
FIG. 9 is a schematic diagram of an initial frame provided by the preferred embodiment of the present invention.

FIG. 9 shows a structure of a modulated initial frame according to the frequency mapping table 1, comprising [F1, F1, F2, F2, M1, M2, ACK], wherein 3 F1s represent a first pilot, and 2 F2s represent a second pilot, and the M1 and M2 are reserved symbols, and ACK represents a response symbol. The symbol ACK is sent by a Slave, and other symbols are sent by the Master, and M1/M2 and ACK are currently fixed to be F3.

S404, confirming whether a correct ACK symbol is received, and if so, then performing step S406, otherwise ending the flow.

S406, modulating the data to be sent into symbols of a data frame according to the preserved frequency mapping table, and sending each symbol of the data frame in turn.

Figure 10:
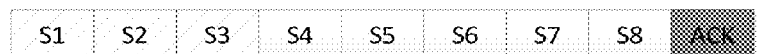
FIG. 10 is a schematic diagram of a data frame provided by the preferred embodiment of the present invention.

Wherein, the preserved frequency mapping table is as the table 1, and the structure of the data frame modulated according to the frequency mapping table 1 is shown as FIG. 10. The data frame comprises symbols [S1, S2, S3, S4, S5, S6, S7, S8, ACK], wherein the S1~S8 represent data symbols and are sent by the Master. The ACK is responded by the Slave and carries response symbols of even parity check information of the S1~S8.

S408, judging whether a correct ACK symbol is received, and if so, performing step S416, otherwise performing step S410.

S410, judging whether a false ACK symbol exceeds a preset times, and if not exceeding, performing step S412; and if exceeding, performing step S414.

Figure 11:
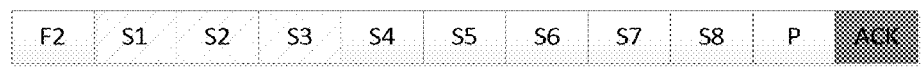
FIG. 11 is a schematic diagram of a re-sent frame provided by the preferred embodiment of the present invention.

S412, sending a re-sent frame of the current data, and turning to the step S408. The structure of the re-sent frame is shown as FIG. 11, wherein pilot F2, data symbols S1~S8, even parity check symbol P are sent by the Master, and the ACK symbol is sent by the Slave.

S414, sending the super-frame to which the current data frame belongs, and turning to the step S408.

Figure 8:
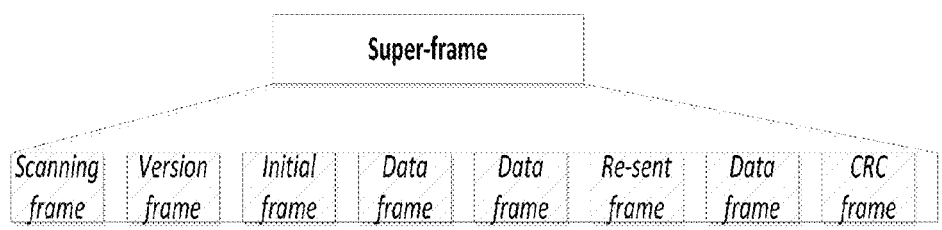
FIG. 8 is a schematic diagram of a super-frame provided by the preferred embodiment of the present invention.

Please refer to the schematic diagram of the super-frame structure as shown in FIG. 8. The super-frame comprises: a scanning frame, a version frame, an initial frame, at least one data frame, a re-sent frame and a CRC frame. Data transmission is used for transmitting modulated data content, wherein the data content needs to constitute one frame from a plurality of modulation symbols. For description convenience, the ACK symbol fed back by the Slave is also classified into a constitution part of one frame from a sending end. For distinguishing each different content, different frame structures are used for identifying corresponding content.

S416, judging whether the data frame is completely sent, and if so, performing step S418, otherwise returning to the step S406;

S418, sending CRC frame signal.

(1) When the 4FSK modulation is employed, sending the CRC frame signal further comprises: calculating CRC check data of both all the data and data length of the current located super-frame; and sending pilot F1, CRC check data and even parity check symbol P in turn.

Figure 12:
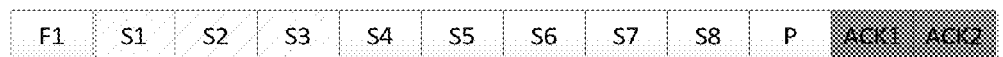
FIG. 12 is a schematic diagram of a 4FSK CRC frame provided by the preferred embodiment of the present invention.

Wherein, the structure of the CRC frame is shown as FIG. 12. The CRC frame comprises symbols [F1, S1, S2, S3, S4, S5, S6, S7, S8, P, ACK1, ACK2]. The F1 represents a first pilot symbol, and the S1~S8 represent data symbols, and P represents even parity check symbol of the CRC frame. The ACK1 is the response symbol responded by the Slave and carrying even parity check information. The ACK2 is the response symbol responded by the Slave and carrying CRC check information.

The even parity check symbol P or ACK checks the data in the frame. For the 4FSK modulation, assuming the symbols in the data frame are $S_{n,b}$, wherein the n=1, 2, . . . , 8 represent symbol sequence number, and b=1, 2 represent the low and high bit of the binary number. The check value is a binary number with two bits. $P_i$, I=1, 2 identify the values of its low and high bits respectively, and its value is calculated by the following equation:

$$P_i = S_{1,i} \oplus S_{2,i} \oplus \ldots \oplus S_{8,i} \quad (0)$$

Wherein, the $\oplus$ represents xor operation.

Take the following as an example: assuming there is data 0101100111011010, then P1=1$\oplus$1$\oplus$0$\oplus$1$\oplus$1$\oplus$1$\oplus$0=1, P2=0$\oplus$0$\oplus$1$\oplus$0$\oplus$1$\oplus$0$\oplus$1$\oplus$1=0, thus P='01', and the frequency F4 is used for modulation when sending.

For the 2FSK modulation, then each symbol only owns one bit, i.e., i is constant to be 1.

As a preferred solution, after sending the even parity check symbol P, it also comprises: confirming whether the ACK1 symbol fed back by the Slave is received and is equal to P, and if so, further judging whether the ACK1 is equal to the ACK2, and if they are equal, judging that the current super-frame is sent completely, and if they are not equal, then re-sending the current super-frame; Otherwise further judging whether the current CRC frame is re-sent exceeding a preset times, and if not exceeding, then re-sending the current CRC frame, and if exceeding, then re-sending the current super-frame.

As a preferred solution, after re-sending the current CRC frame, it also comprises: when the ACK symbol is not received during ACK waiting time and the CRC frame is re-sent not exceeding a preset times, re-sending the current CRC frame; When the current CRC frame is re-sent exceeding the preset times, re-sending the super-frame to which the current CRC frame belongs.

Figure 14:
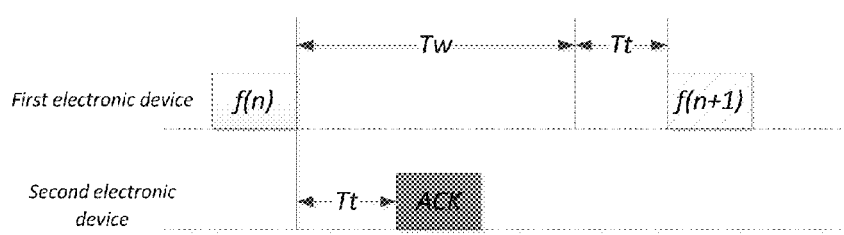
FIG. 14 is a schematic diagram of ACK waiting time provided by the preferred embodiment of the present invention.

Wherein, please refer to FIG. 14 for the ACK waiting time, and f(n), f(n+1) represent the n-th frame and the n+1-th frame, and the ACK represents the ACK symbol. Time Tg=Tw+Tt is a maximum time interval that is allowed from the end of the last symbol in the last frame to the beginning of the first symbol in the next frame, wherein Tt is switching time of the Master and the Slave from receiving to sending. If the Master receives the response (including the ACK symbol and data) of the Slave during the time Tw, then it is considered to be an effective response, i.e., the Tw is the maximum time for which the Master waits for the response of the Slave. After the Slave receives the last symbol of one frame, it starts to send the ACK symbol again after the time Tt.

(2) When the 2FSK modulation is employed, sending the CRC frame signal further comprises: when the 2FSK modulation is employed, sending the CRC frame to the Slave further comprises: calculating the CRC check data of both all the data and data length of the current located super-frame, even parity check value P of a first CRC frame and a second CRC frame; and sending the pilot F1, the first CRC frame, and the second CRC frame in turn.

Figure 13:
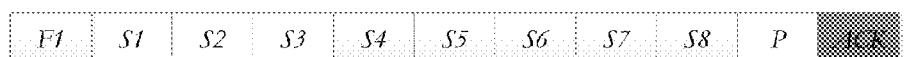
FIG. 13 is a schematic diagram of a 2FSK CRC frame provided by the preferred embodiment of the present invention.
Figure 13:
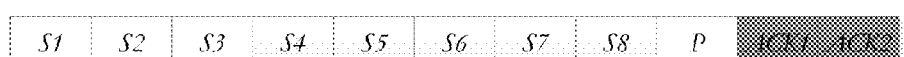

Wherein, the structures of the first CRC frame and the second CRC frame are shown as FIG. 13, and the first CRC frame comprises symbols [F1, S1, S2, S3, S4, S5, S6, S7, S8, P, ACK], and the second CRC frame comprises symbols [S1, S2, S3, S4, S5, S6, S7, S8, P, ACK1, ACK2], wherein, the F1 represents the first pilot symbol, and the S1~S8 represent data symbols, and the P represents the even parity check symbol of the CRC frame, and the ACK is the response symbol that is responded by the Slave and carries the even parity check information of the first CRC frame, and the ACK1 is the response symbol that is responded by the Slave and carries the even parity check information of the second CRC frame, and the ACK2 is the response symbol that is responded by the Slave and carries the CRC check information.

After sending the first CRC frame, it also comprises: confirming whether the ACK symbol fed back by the Slave is received and the ACK symbol is correct, and if not so, further judging whether the first CRC frame is re-sent exceeding a preset times, and if not exceeding, then re-sending the first CRC frame, and if exceeding, then sending the current super-frame.

After re-sending the first CRC frame, it also comprises: when the ACK symbol is not received during the ACK waiting time and the CRC frame is re-sent not exceeding a preset times, re-sending the current CRC frame; and when the CRC frame is re-sent exceeding the preset times, re-sending the current super-frame. The preset times may be set to 5 times.

After sending the second CRC frame, it also comprises: confirming whether the received ACK1 symbol fed back by the Slave is same as the P, and if so, further judging whether the ACK1 is same as the ACK2, and if they are same, then judging that the current super-frame is sent completely, and if they are not same, then re-sending the current super-frame; Otherwise, further judging whether the current CRC frame is re-sent exceeding a preset times, and if not exceeding, then re-sending the current CRC frame, and if exceeding, then re-sending the current super-frame.

As a preferred solution of this step, after sending the second CRC frame, it also comprises: when the ACK symbol is not received during the ACK waiting time and the second CRC frame is re-sent not exceeding the preset times, re-sending the second CRC frame; and when the second CRC frame is re-sent exceeding the preset times, re-sending the current super-frame.

Embodiment 6

Figure 15:
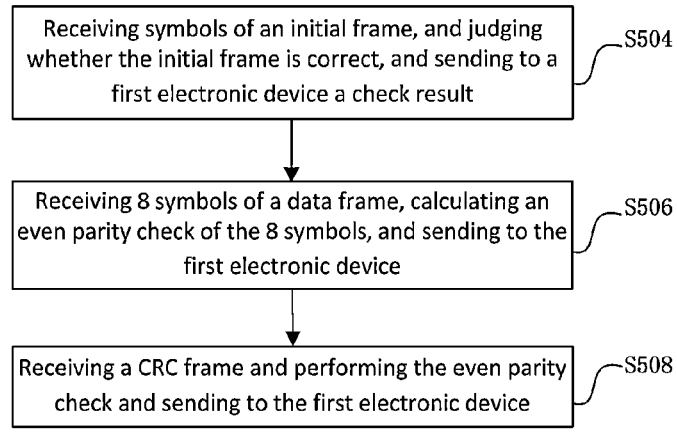
FIG. 15 is a flow chart of a method for data transmission provided by the preferred embodiment of the present invention.

FIG. 15 shows a flow chart of a method for data transmission provided by the preferred embodiment of the present invention, wherein the method is applied to a Slave and comprises:

S502, receiving symbols of an initial frame, judging whether the initial frame is correct, and sending to the Master the check result.

In detail, receiving each symbol of the initial frame; detecting whether the received initial frame is correct, and if so, then responding a correct ACK, otherwise responding a false ACK.

Wherein, judging whether it is correct may be by detecting whether a designated frame of 3F1+2F2, and M1 and M2 exist, if so, then it is correct, and responding symbol modulated by F3, otherwise, responding symbol not modulated by F3, and switching to a data receiving status.

S504, receiving 8 symbols of a data frame, and calculating even parity check of these 8 symbols and sending to the Master.

S506, receiving a CRC frame and sending the even parity check ACK to the Master.

In detail, when a 4FSK modulation is employed, performing the following steps:
(1) detecting the first symbol of the current frame, and if it is the F2, then being the CRC frame;
(2) detecting 8 symbols of the F2;
(3) calculating the even parity check value ACK1 of the CRC;
(4) calculating the CRC value of all the data and data length of the current located super-frame, and comparing with a value carried by the CRC frame, and if they are equal, ordering ACK2=ACK1, otherwise, setting a value different from the ACK1;
(5) switching to a sending mode, and sending ACK1, ACK2.
(6) switching to a data receiving mode.

When a 2FSK modulation is employed, performing the following steps:
(1) detecting the first symbol of the current frame, and if it is the F2, then being the CRC frame;
(2) detecting 8 symbols after the F2;
(3) calculating even parity check value P1 of the first CRC frame;
(4) switching to the sending mode, and sending P1;
(5) starting to detect a second frame, and if the first symbol is the F2, returning to the step (1); otherwise, going to step (6);
(6) detecting a second CRC frame, and calculating the CRC value of all the data and data length of the current located super-frame, and comparing with the value carried by the CRC frame, and If they are equal, ordering ACK2=ACK1, otherwise, setting the value different from the ACK1;
(7) switching to the data sending mode, and sending the ACK1, ACK2;
(8) switching to the data receiving mode.

Embodiment 7

Figure 16:
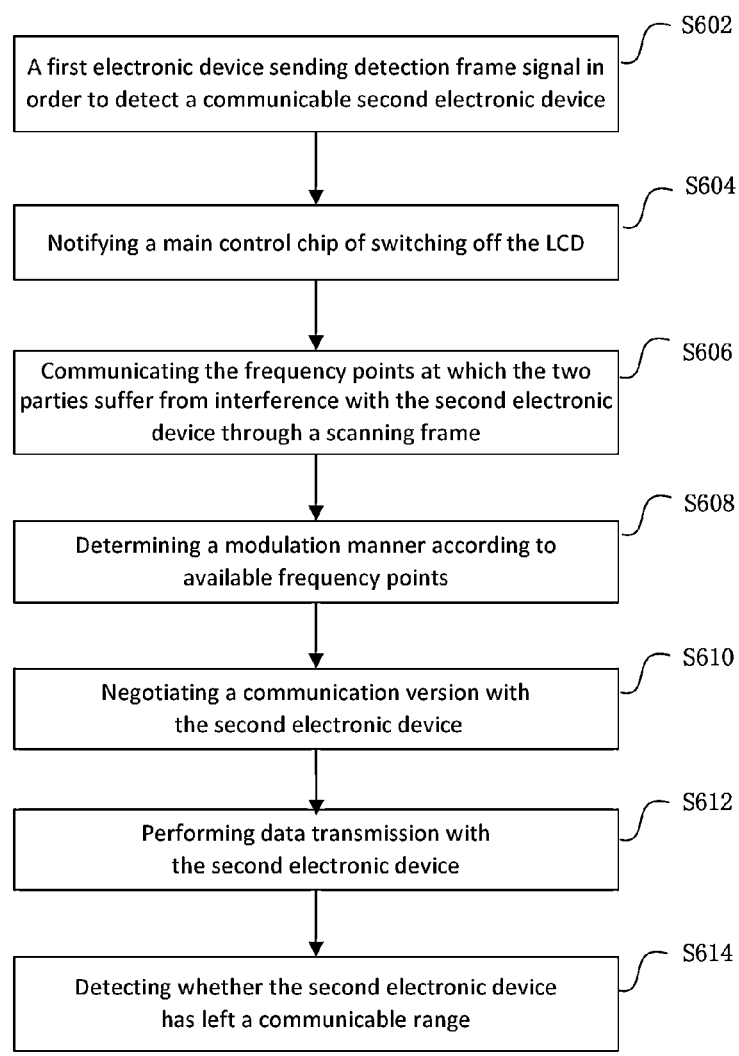
FIG. 16 is a flow chart of a method for near field communication of an electronic device provided by the preferred embodiment of the present invention.

FIG. 16 shows a flow chart of a method for near field communication of an electronic device provided by the preferred embodiment of the present invention.

S602, a Master sending detection frame signal to detect a communicable Slave.

In detail, the Master sends the detection frame signal, and judges whether the Slave is within a range, where the near field communication is available, according to a received response frame responded by the Slave. Wherein, the detection frame comprises at least two symbols modulated by using different frequencies.

S604, notifying a main control chip of switching off an LCD.

S606, communicating frequency points at which the two parties suffer from interference with the Slave through a scanning frame.

S608, determining a modulation manner according to available frequency points.

S610, negotiating a communication version with the Slave.

Figure 17:
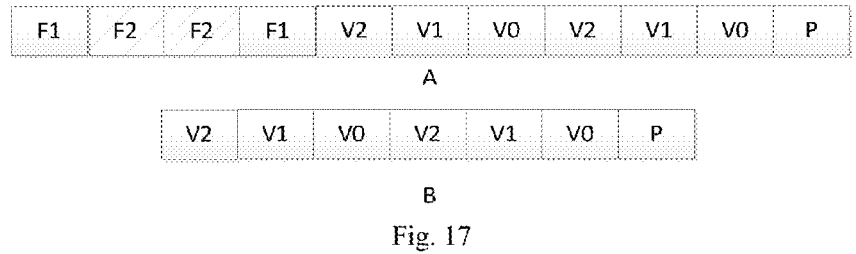
FIG. 17 is a schematic diagram of a version frame provided by the preferred embodiment of the present invention.

In detail, the Master sends version information to the Slave by using a version frame, and determines a used communication version according to a version response frame fed back by the Slave. For example, the structures of the version frames are shown as FIG. 17, wherein the version frame A is sent by the Master, comprising [F1, F2, F2, F1, V2, V1, V0, V2, V1, V0, P], and the version response frame B is sent by the Master or the Slave, and the version response frame comprises [V2, V1, V0, V2, V1, V0, P], and the symbols V0~V2 modulated by using a 2FSK are version information. The V0 is the lowest bit, and the V2 is the highest bit. When the version information bits are "000" or "111", it represents that the versions are not compatible with each other. The version number is started with "000". The larger the value is, the higher the version number is. The symbol P is the even parity check of the V0~V2, and for the version frame, the even parity check only checks three symbols (one bit per symbol) of V2, V1, V0, etc. The version frame is transmitted in a manner of the 2FSK, wherein the F1 F2 F2 F1 are the preamble.

Specifically, it further comprises the following steps:
(1) the Master sending its own version information to the Slave by using the version frame A;
(2) the Slave responding its own version information by using the version response frame B;
(3) the Master determining which version to use, and sending the version information by using the version response frame B; and if the two versions are not compatible, sending in-compatible signaling;
(4) the Slave responding an ACK symbol of the version response frame B, and going to step 5; and if it is an in-compatible signaling, disconnecting the connection;
(5) if the detection of the Master is successful, ending the version information exchange; Otherwise, repeating steps (1)~(5) once, and if it is not successful and the version in-compatible information is not received, performing the frequency point negotiation in an adaptation modulation phase again.

S612, performing data transmission with the Slave.

S614, detecting whether the Slave has left a communicable range.

Preferably, this step further comprises: if a response of the Slave is not detected in a preset time after the detection frame signal is sent, then judging that the Slave has left the communicable range.

In detail, a leaving detection function is realized by multiplexing the two part functions of data sending and frequency scanning, and timing for the detailed procedure.
(1) after the Master and the Slave succeed in an approach detection and enter into a data mode:
  (a) if there is no data to be sent or received, then switching on the leaving detection after 2s;
  (b) if there is data to be sent, then switching on the leaving detection after successfully sending or receiving the data;
(2) the Slave reviews whether there is normal data transmission or a special leaving detection;
  (a) if there is data reception, then immediately entering into a leaving detection mode after the data reception is completed;
  (b) if any effective signal of the Master is not received after having entered into a leaving mode for exceeding 1 second, then considering that the Master has left, and ending the connection by the Slave.
(3) the Master is classified into two cases:
  (a) if there is data to be sent, then sending the data normally; entering into the leaving detection mode after successfully sending; and when the frequency scanning is failed to be sent, the detection being failed, and if the failure continues for larger than 1s, then confirming that the Slave has left;
  (b) if there is no data to be sent, then the Master performing the frequency scanning once every 50 ms after entering into the leaving mode, and the Slave should respond according to the flow of the frequency scanning (or an adaptation modulation) after receiving a scanning frame, and if the response of the Slave to the scanning frame is not received for exceeding continuous 20 times, then considering that the Slave has left, and ending the connection.

In the method for near field communication provided by the embodiment of the present invention, by sending a detection frame comprising at least two symbols modulated by using different frequencies, it can be detected in an interference environment whether the Slave is approaching; Meanwhile, communication is realized by a best combination of a plurality of optimum solutions, thus the interference is reduced or shielded from several aspects, and the communication quality is ensured.

Embodiment 8

Figure 18:
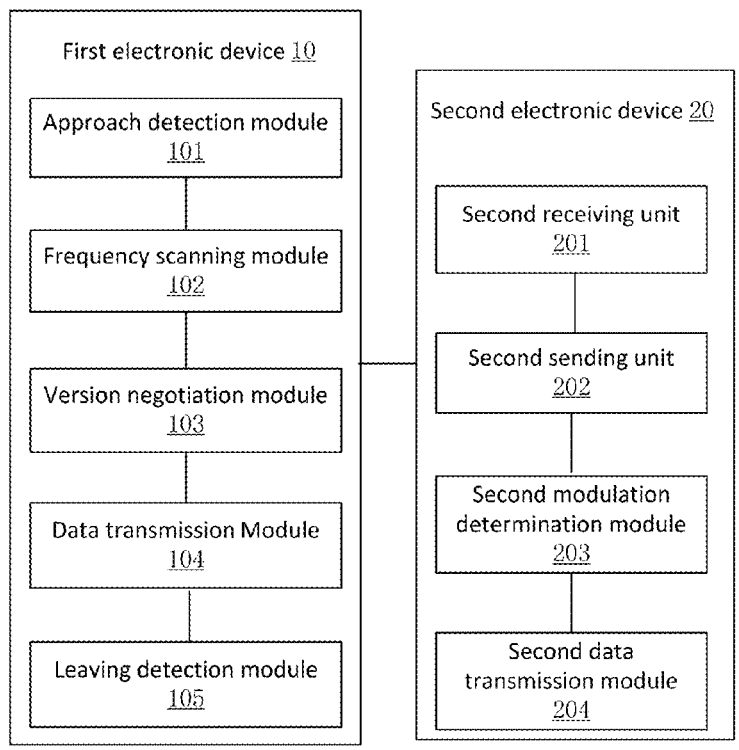
FIG. 18 is a structure diagram of a near field communication system for an electronic device provided by the preferred embodiment of the present invention.

FIG. 18 shows a system for near field communication of an electronic device provided by the preferred embodiment of the present invention, and the system comprises a first electronic device 10, and the first electronic device 10 further comprises:

A frequency scanning module 102, for communicating frequency points at which the two parties suffer from interference with a Slave through a scanning frame, and determining a modulation manner according to available frequency points; wherein the scanning frame comprises at least two symbols modulated by using different frequencies.

In detail, the frequency scanning module 102 is specifically used for: sending the scanning frame to the Slave, and obtaining the frequency points at which the two parties suffer from interference according to a received a response frame responded by the Slave, and feeding back to the Slave an available frequency point frame, and determining the modulation manner according to the available frequency points.

A data transmission module 104, for performing data transmission with the Slave.

In detail, the data transmission module 104 is specifically user for: sending an initial frame, at least one data frame and a CRC frame to the Slave in turn.

As another preferred embodiment, the first electronic device 10 also comprises an approach detection module 101, for sending detection frame signal, and judging whether the slave is in a range where the near field communication is available according to a received response frame responded by the Slave, wherein the detection frame comprises at least two symbols modulated by using different frequencies.

As another preferred embodiment, the first electronic device 10 also comprises a version negotiation module 103, for sending version information to the Slave by using a version frame, and determining a used version according to a version response frame fed back by the Slave.

As another preferred embodiment, the first electronic device 10 also comprises a leaving detection module 105, for detecting whether the Slave has left a communicable range. The leaving detection module 105 is specifically used for: when the communicable Slave is not detected by sending detection frame signal, judging whether the Slave has left the communicable range.

In addition, the system also comprises a second electronic device 20, and the second electronic device 20 further comprises:

A second receiving module 201, for receiving the scanning frame sent by the Master; and also for receiving the available frequency point frame sent by the Master;

A second sending module 202, for feeding back to the Master a response frame into which its own interference frequency point information is added;

A second modulation determination module 203, for obtaining available frequency points according to the available frequency point frame, and determining the modulation manner according to the available frequency points;

A second data transmission module 204, for performing data transmission with the Master.

The technical features in the above mentioned method embodiments are also applicable to the present system embodiment, and herein the description is omitted.

It should be noted that any electronic device utilizing electric field for near field communication is within the claimed scope of the present invention. The electronic device in the embodiments of the present invention comprises and are not limited to the terminal of capacitance touch screen (for example, iPhone, iPad), and terminals having touch panel, touch key, touch slider (for example, Notebook, iPod, etc.). The electronic device in the embodiments of the present invention can also connected to other electronic devices through interfaces of USB, HDMI, audio input and output (for instance, earphone jack) and so on in order to realize near field communication function.

In the above, the preferred embodiments of the present invention are illustrated with reference to the appended figures, and it does not thus limit the right scope of the present invention. Without departing the scope and substance of the present invention, there may be a plurality of variation solutions to realize the present invention, for instance, the technical feature as in one embodiment may be used in another embodiment, and thus obtaining still another embodiment. Any modification, equivalent substitution, and improvement made within applying the technical concept of the present invention should be in the claimed scope of the present invention.

INDUSTRIAL APPLICABILITY

The method and system for near field communication of an electronic device, provided by the present invention, detect interference frequencies in a communication environment by sending a scanning frame which comprises at least two symbols modulated by using different frequencies, and select frequency points with smaller interference for adaptation modulation data, thus the interference frequency points are shielded from data transmission, and the external interference in the near field communication is avoid, and the communication quality can be improved.

What is claimed is:

1. A method for near field communication of an electronic device, wherein the method is applied to a first electronic device and comprises:
   communicating frequency points at which the two parties suffer from interference with a second electronic device through a scanning frame, and determining a modulation manner according to available frequency points, wherein the scanning frame comprises at least two symbols modulated by different frequencies;
   performing data transmission with the second electronic device according to the determined modulation manner;
   wherein, communicating the frequency points at which the two parties suffer from interference with the second electronic device through the scanning frame further comprises:
   sending the scanning frame to the second electronic device;
   according to a received response frame responded by the second electronic device, obtaining the information of the frequency points at which the two parties suffer from the interference; or, obtaining its own interference frequency point information through the scanning frame responded by the second electronic device, and obtaining the information of frequency points at which the second electronic device suffers from interference;
   according to the information of frequency points at which the two parties suffer from interference, feeding back an available frequency point frame to the second electronic device.

2. The method for near field communication according to claim 1, wherein, prior to the method, it also comprises a step of sending detection frame signal in order to detect the communicable second electronic device, and the step further comprises:
   sending the detection frame signal, wherein said detection frame comprises at least two symbols modulated by using different frequencies;
   according to a received response frame responded by the second electronic device, judging whether the second electronic device is within a range where the near field communication is available.

3. The method for near field communication according to claim 1, wherein, according to the received response frame responded by the second electronic device, obtaining the frequency points at which the two parties suffer from interference further comprises:

according to positions where and/or times that each frequency point appears in said response frame, determining the interference frequency point information of the second electronic device;

or, according to the times that each frequency point appears in the scanning frame responded by the second electronic device, determining its own interference frequency point information, and according to the positions where and/or times that each frequency point appears in said response frame, determining the interference frequency point information of the second electronic device.

4. The method for near field communication according to claim 1, wherein, according to the information of frequency points at which the two parties suffer from interference, feeding back the available frequency point frame to the second electronic device further comprises:

according its own interference frequency point information and the interference frequency point information of the second electronic device, obtaining the available frequency point frame;

sending said available frequency point frame to the second electronic device, or, sending a preset guide frame first and then sending said available frequency point frame.

5. The method for near field communication according to claim 4, wherein, according to its own interference frequency point information and the interference frequency point information of said second electronic device, obtaining the available frequency point frame further comprises:

when there is no interference frequency point, the available frequency point frame is obtained by, after said scanning frame is inverted, appending any one of the frequency point symbols in the scanning frame at the end;

when there is only one interference frequency point, the available frequency point frame is obtained by moving the interference frequency point to be after the scanning frame, moving forward the frequency point symbols after the interference frequency point in turn, and then adding one symbol of this interference frequency point at the end;

when there are at least two interference frequency points, the available frequency point frame is obtained by repeating the first interference frequency point symbols once and placing them after the available frequency point symbols of the scanning frame, and the interference frequency point symbols after it are moved backwards in turn; or if the interference frequency points are only the last continuous frequency points in the scanning frame, then the available frequency point frame is obtained by repeating the first interference frequency point symbols once and placing them after the available frequency points of the scanning frame, and moving backwards the interference frequency point symbols after it in turn, if the interference frequency points are the last continuous frequency points and other frequency points in the scanning frame, then the available frequency point frame is obtained by placing the first interference frequency point symbols after the available frequency points of the scanning frame, and moving backwards the interference frequency point symbols after it in turn, and if it is the first frequency point of the last continuous frequency point, then repeating two times;

if the interference frequency points are not the last continuous frequency points in the scanning frame, then the available frequency point frame is obtained by placing the first interference frequency point symbols after the available frequency points of the scanning frame, and moving backwards the interference frequency point symbols after it in turn, and adding any one of frequency points that suffer from interference at the last.

6. The method for near field communication according to claim 1, wherein the scanning frame is $[F_1', F_2', F_3', F_4', F_5', F_6', F_7']$, and said response frame and available frequency point frame is $[R1, R2, R3, R4, R5, R6, R7, R8]$, wherein said $F_1', F_2', F_3', F_4', F_5', F_6', F_7'$ represent symbols modulated by using different frequencies respectively, and R1~R8 represent symbols in $F_1', F_2', F_3', F_4', F_5', F_6', F_7'$.

7. The method for near field communication according to claim 6, which is characterized in that $F_1', F_2', F_3', F_4', F_5', F_6', F_7'$ are symbols modulated by using 450 KHz, 400 KHz, 350 KHz, 300 KHz, 250 KHz, 200 KHz, 150 KHz respectively, or modulated by using any 7 continuous frequencies selected from {525 KHz, 487.5 KHz, 450 KHz, 412.5 KHz, 375 KHz, 337.5 KHz, 300 KHz, 262.5 KHz, 225 KHz, 187.5 KHz, 150 KHz}.

8. The method for near field communication according to claim 1, wherein determining the modulation manner according to the available frequency points further comprises:

when the available frequency points are greater than or equal to 6, the first 6 frequencies are selected to be modulated by the 4FSK manner;

when the available frequency points are greater than or equal to 4 and smaller than 6, the first 4 frequencies are selected to be modulated by the 2FSK manner;

when the available frequency points are smaller than 4, re-selecting the scanning frame in order to perform the step of frequency scanning.

9. The method for near field communication according to claim 1, wherein, before performing the data transmission with the second electronic device, it also comprises a step of version negotiation, and the step of the version negotiation further comprises: sending version information to the second electronic device by using a version frame, and determining the used communication version according to a version response frame fed back by the second electronic device.

10. The method for near field communication according to claim 9, wherein said version frame comprises [F1, F2, F2, F1, V2, V1, V0, V2, V1, V0, P], and said version response frame comprises [V2, V1, V0, V2, V1, V0, P], wherein the symbols F1 and F2 represent preamble codes, and symbols V0~V2 represent a version number, and the symbol P is the even parity check of V0~V2.

11. The method for near field communication according to claim 1, wherein said performing data transmission with the second electronic device further comprises: sending to the second electronic device an initial frame, at least one data frame and a CRC frame in turn.

12. The method for near field communication according to claim 11, wherein said sending the initial frame to the second electronic device further comprises:

modulating the data to be sent into symbols of the initial frame according to a preserved frequency mapping table;

sending each symbol of the initial frame in turn;

confirming whether a correct ACK symbol fed back by the second electronic device is received, and if so, then turning to sending data frame signal.

13. The method for near field communication according to claim 11, wherein said initial frame comprises [F1, F1, F2, F2, M1, M2, ACK], wherein the F1 represents a first pilot, and F2 represents a second pilot, and M1 and M2 are reserved symbols, and ACK is a response symbol.

14. The method for near field communication according to claim 11, wherein sending the data frame to the second electronic device further comprises:
   modulating the data to be sent into symbols of the data frame according to a preserved frequency mapping table;
   sending each symbol of said data frame in turn;
   confirming whether a correct ACK symbol fed back by the second electronic device is received, and if so, further judging whether the data is completely sent, and if not completely sent, then sending the next data frame, and if completely sent, then sending the CRC frame; Otherwise, further judging whether a false ACK symbol exceeds a preset times, and if not exceeding, then sending a re-sent frame of current data; and if exceeding, then sending a super-frame which the current data frame belongs to.

15. The method for near field communication according to claim 11, wherein said data frame comprises [S1, S2, S3, S4, S5, S6, S7, S8, ACK], wherein the S1~S8 represent data symbols and the ACK is a response symbol which is responded by the second electronic device and carries the even parity check information of the S1~S8.

16. The method for near field communication according to claim 11, wherein said sending the CRC frame to the second electronic device further comprises:
   when a 4FSK modulation is employed: calculating the CRC check data of both all the data and data length of a current belonged super-frame; and sending pilot F1, CRC check data and an even parity check symbol P in turn;
   when a 2FSK modulation is employed: calculating the CRC check data of both all the data and data length of the current belonged super-frame, an even parity check value P of a first CRC frame and a second CRC frame; and sending the pilot F1, the first CRC frame, and the second CRC frame in turn.

17. The method for near field communication according to claim 11, wherein,
   when 4FSK modulation is employed, said CRC frame comprises symbols [F1, S1, S2, S3, S4, S5, S6, S7, S8, P, ACK1, ACK2], wherein the F1 represents a first pilot symbol, and the S1~S8 represent data symbols, and the p represents even parity check symbol of the CRC frame, and ACK1 is a response symbol which is responded by the second electronic device and carries even parity check information, and the ACK2 is a response symbol which is responded by the second electronic device and carries the CRC check information;
   when 2FSK modulation is employed, said CRC frame comprises a first CRC frame and a second CRC frame, wherein said first CRC frame comprises symbols [F1, S1, S2, S3, S4, S5, S6, S7, S8, P, ACK], and said second CRC frame comprises symbols [S1, S2, S3, S4, S5, S6, S7, S8, P, ACK1, ACK2], wherein the F1 represents a first pilot symbol, and the S1~S8 represent data symbols, and the P represents even parity check symbol of the CRC frame, and the ACK is the response symbol which is responded by the second electronic device and carries the even parity check information of the first CRC frame, and the ACK1 is the response symbol which is responded by the second electronic device and carries the even parity check information of the second CRC frame, and the ACK2 is the response symbol which is responded by the second electronic device and carries CRC check information.

18. The method for near field communication according to claim 1, wherein after said performing the data transmission with the second electronic device, it also comprises: a step of detecting whether the second electronic device has left a communicable range, and this step further comprises:
   if a response of the second electronic device is not detected in a preset time after sending detection frame signal, then judging that the second electronic device has left the communicable range.

19. A method for near field communication of an electronic device, wherein the method is applied to a second electronic device and comprises the following steps:
   receiving a scanning frame sent by a first electronic device, and obtaining its own frequency points that suffer from interference;
   sending to said first electronic device a response frame into which its own frequency point information is added;
   receiving an available frequency point frame sent by the first electronic device, and obtaining the available frequency point information;
   according to the available frequency point information, determining a modulation manner in order to perform data transmission with said first electronic device.

20. The method for near field communication according to claim 19, wherein before sending to said first electronic device the response frame into which its own interference frequency point information is added, it also comprises: sending the scanning frame to said first electronic device.

21. The method for near field communication according to claim 19, wherein sending to said first electronic device the response frame into which its own interference frequency point information is added further comprises:
   when there is no interference frequency point, the response frame is obtained by, after said scanning frame is inverted, appending any one of frequency point symbols in the scanning frames at the end, and sending to said first electronic device;
   when there is one interference frequency point, the response frame is obtained by moving the interference frequency point after said scanning frame, and moving forwards the frequency point symbols after the interference frequency point in turn, and then adding a symbol of this interference frequency point at the last, and sending to said first electronic device;
   when there are at least two interference frequency points, the response frame is obtained in the following manner and sending to said first electronic device:
   the response frame is obtained by repeating the first interference frequency point symbols once and placing them after the available frequency points of the scanning frame, and moving backwards the interference frequency point symbols after it in turn; or if the interference frequency points are the last continuous frequency points in the scanning frame, then the response frame is obtained by repeating the first interference frequency point symbols once and placing them after the available frequency points of the scanning frame, and moving backwards the interference frequency point symbols after it are moved backwards in turn;
   if the interference frequency points are the last continuous frequency points and other frequency points in the scanning frame, then the response frame is obtained by placing the first interference frequency point symbols after the available frequency points of the scanning frame, and moving backwards the interference frequency point symbols after it in turn, and if it is the first frequency point of the last continuous frequency points, then repeating two times;

if the interference frequency points are not the last continuous frequency points in the scanning frame, then the response frame is obtained by placing the first interference frequency point symbols after the available frequency points of the scanning frame, and moving backwards the interference frequency point symbols after it in turn, and adding any one of frequency points which suffer from interference at the last.

22. The method for near field communication according to claim 19, wherein receiving the available frequency point frame sent by said first electronic device, and obtaining the available frequency point information further comprises:

obtaining the available frequency points according to the positions where and times that each frequency point symbol of said available frequency point frame appears.

23. The method for near field communication according to claim 19, which is characterized in that performing data transmission with said first electronic device further comprises: receiving an initial frame, at least one data frame and CRC frame sent by the first electronic device in turn.

24. A system for near field communication of an electronic device, comprising a first electronic device, and said first electronic device comprises:

a frequency scanning module, for communicating frequency points at which the two parties suffer from interference with a second electronic device through a scanning frame, and determining a modulation manner according to available frequency points, wherein said scanning frame comprises at least two symbols modulated by using different frequencies;

a data transmission module, for performing data transmission with the second electronic device;

wherein said frequency scanning module is specifically used for: sending the scanning frame to the second electronic device, and according to a received response frame responded by the second electronic device, obtaining the frequency points at which the two parties suffer from interference, feeding back an available frequency point frame to the second electronic device, and determining the modulation manner according to the available frequency points.

25. The system for near field communication according to claim 24, wherein said first electronic device also comprises an approach detection module, for sending detection frame signal, and according to a received response frame responded by the second electronic device, judging whether said second electronic device is in a range where the near field communication is available, wherein said detection frame comprises at least two symbols modulated by different frequencies.

26. The system for near field communication according to claim 24, wherein said first electronic device also comprises a version negotiation module, for sending version information to the second electronic device through a version frame, and determining the used version according to a version response frame fed back by the second electronic device.

27. The system for near field communication according to claim 24, wherein said first electronic device also comprises a leaving detection module, for detecting whether the second electronic device has left a communicable range.

28. The system for near field communication according to claim 27, wherein the leaving detection module is specifically used for: when the communicable second electronic device is not detected by sending detection frame signal, then judging whether the second electronic device has left the communicable range.

29. The system for near field communication according to claim 24, wherein said data transmission module is specifically used for: sending an initial frame, at least one data frame and a CRC frame to the second electronic device in turn.

30. The system for near field communication according to claim 29, wherein said system also comprises the second electronic device, and the second electronic device comprises:

a second receiving module, for receiving the scanning frame sent by the first electronic device; and also for receiving an available frequency point frame sent by said first electronic device;

a second sending module, for sending to said first electronic device a response frame into which its own interference frequency point information is added;

a second modulation determination module, for obtaining available frequency points according to said available frequency point frame, and determining the modulation manner according to the available frequency points;

a second data transmission module, for performing the data transmission with said first electronic device.

* * * * *